United States Patent [19]

Ion et al.

[11] 3,945,268

[45] Mar. 23, 1976

[54] MOTION TRANSMITTING REMOTE CONTROL ASSEMBLY

[75] Inventors: John C. Ion, Doylestown; George M. Zieber, Jr., King of Prussia, both of Pa.

[73] Assignee: Teleflex Incorporated, North Wales, Pa.

[22] Filed: Sept. 19, 1974

[21] Appl. No.: 507,390

[52] U.S. Cl.................. 74/501 R; 74/502; 64/2 R
[51] Int. Cl.$^2$......................... F16C 1/10; F16C 1/02
[58] Field of Search............ 74/501 R, 502; 64/2 R, 64/23

[56] References Cited
UNITED STATES PATENTS

| | | | |
|---|---|---|---|
| 3,021,722 | 2/1962 | Bratz et al. | 74/501 |
| 3,362,249 | 1/1968 | Richoux | 74/501 |
| 3,452,615 | 7/1969 | Gregory, Jr. | 74/501 |
| 3,464,285 | 9/1969 | McCabe | 64/2 R X |
| 3,509,782 | 5/1970 | Molnar | 74/501 |
| 3,631,731 | 1/1972 | Hawhee | 74/501 R |
| 3,643,523 | 2/1972 | Mihaila | 74/502 |
| 3,841,171 | 10/1974 | Young, Jr. | 74/501 R |

*Primary Examiner*—Samuel Scott
*Assistant Examiner*—P. S. Lall
*Attorney, Agent, or Firm*—McGlynn and Milton

[57] ABSTRACT

A motion transmitting remote control assembly including a flexible conduit, tubular end members at each end of the conduit, load bearing members comprising a plurality of helically wound wire members surrounding a portion of the conduit and attached to the end members, a motion transmitting core element supported for axial movement within the conduit, antifriction members for engaging the core element for facilitating movement thereof, retainer members for retaining the antifriction members, and unanchored, freely axially movable race members disposed between the antifriction members and the conduit whereby bending of the assembly is relatively unrestricted by the race members.

21 Claims, 5 Drawing Figures

U.S. Patent   March 23, 1976   3,945,268
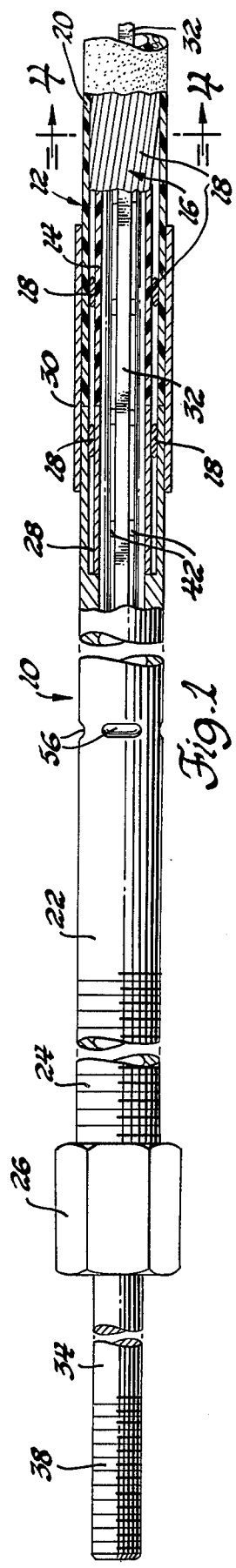
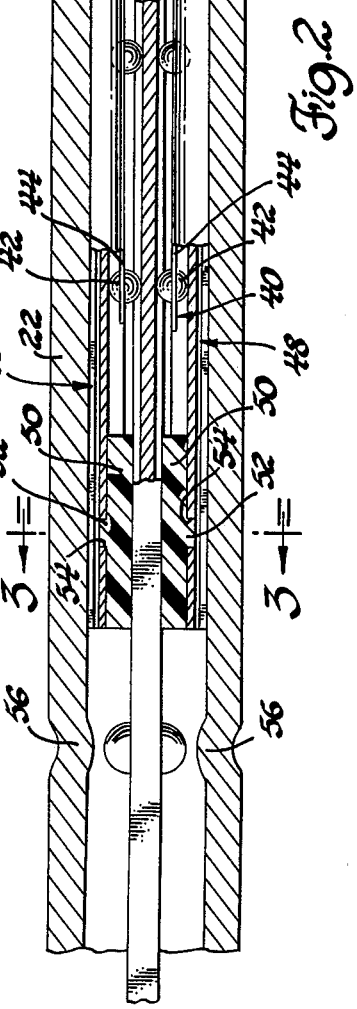
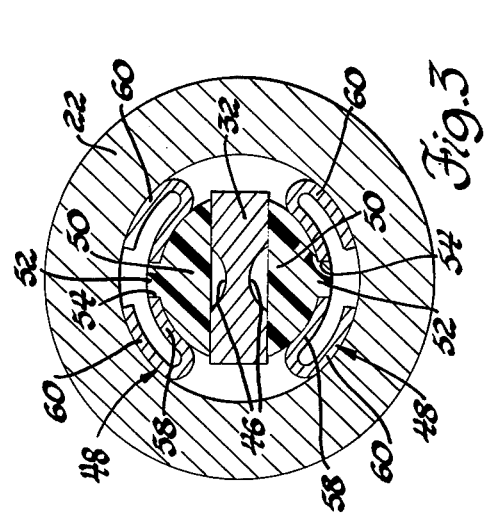
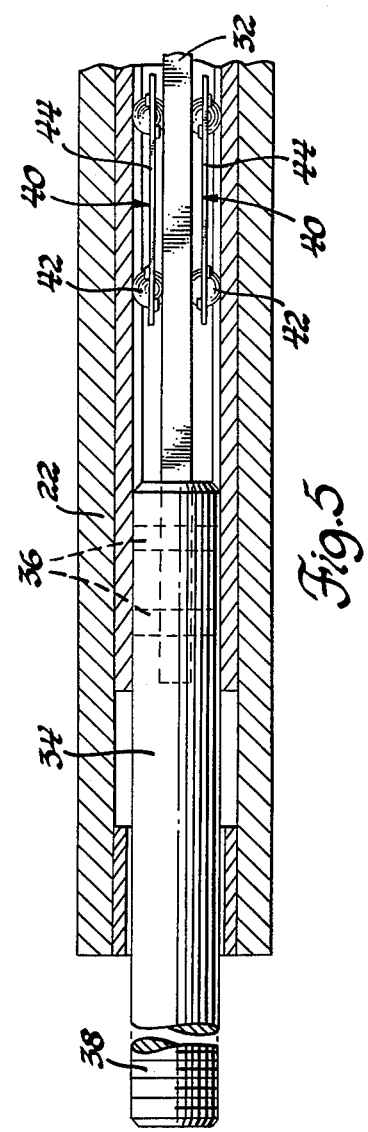
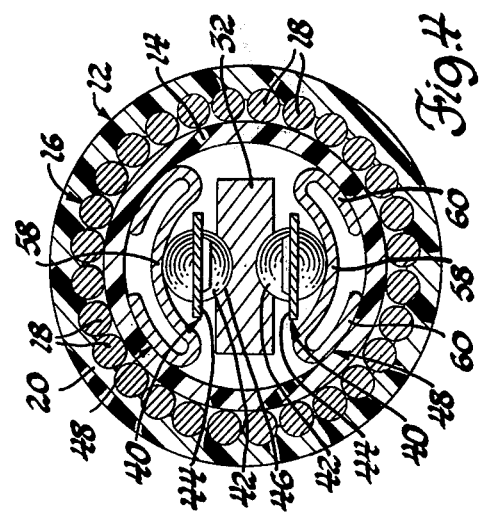

MOTION TRANSMITTING REMOTE CONTROL ASSEMBLY

This invention relates to a motion transmitting remote control assembly of the type which includes a flexible conduit, a core element supported for axial movement within the conduit, antifriction members for facilitating movement of the core element, and race members between the antifriction members and the conduit.

Assemblies of this type generally include end fittings at both ends of the flexible conduit for attaching the assembly to a bulkhead. Currently, at least one of the race members is anchored or otherwise securely connected to the end fittings to provide a load path between the end fittings so that forces caused by the operation of the translating core element are transmitted to the end fittings for reaction. Due to this arrangement, flexing or bending of the conduit is restricted or limited. In other words, since at least one of the race members is anchored to the end fittings, the total degree of bending is dependent upon the mechanical properties of the material used in the race members and particularly the yield strength. Since the race members must be capable of supporting loads, they are generally made of metal which has the required tensile strength. Such metal race members, however, have a very limited range of elastic deformation. Consequently, the degree of bending of the assembly is severely limited. In other words, when the assembly is bent, the race member on the outer side of the bend is placed in tension while the race member on the inner side of the bend is placed in compression. The tensile and compressive forces increase as the degree of bending increases. Should these forces exceed the yield strength of the material, plastic deformation will occur and the race members will be permanently deformed. Consequently, the degree of bending of the assembly is restricted by the anchored race member.

In some motion transmitting control assemblies, such as those shown in the U.S. Pat. Nos. to Bratz 3,154,966 issued Nov. 3, 1964 and Richoux 3,128,637 issued Apr. 14, 1964, the end of one of the race members is provided with an axially extending slot which cooperates with a tongue in the end fitting of the assembly to permit limited axial movement of the race member. It is noted, however, that the other race member is fixed or anchored to the end fitting. The degree of bending of these assemblies, therefore, is also dependent upon the ability of the "fixed" race member to elasticly deform even though one of the race members is unanchored. The reason that one race member must remain anchored to the end fittings is that no other element of the assembly is capable of transmitting the operational loads to the end fittings.

The instant invention provides a motion transmitting remote control assembly which has superior bending characteristics than assemblies heretofore known. To accomplish this result, the race members are totally unanchored and freely axially movable. Accordingly, the degree of bending of the assembly is not restricted by the race members. The assembly also includes load bearing means surrounding a portion of the flexible conduit and attached to the end fitting. The load bearing means provides a load path between the end fittings for transmitting operational loads to the end fittings for reaction. The load bearing means in the preferred embodiment of the instant invention includes a plurality of helically wound wires.

Other purposes and functions of the instant invention will be readily appreciated as the same becomes better understood by reference to the following detailed description when considered in connection with the accompanying drawings wherein:

FIG. 1 is an elevational view, partially broken away, of a preferred embodiment constructed in accordance with the instant invention;

FIG. 2 is a longitudinal cross-sectional, elevational view of a portion of the instant embodiment shown in FIG. 1;

FIG. 3 is a transverse cross-sectional view taken generally along line 3—3 of FIG. 2;

FIG. 4 is a transverse cross-sectional view taken generally along line 4—4 of FIG. 1; and FIG. 5 is a longitudinal, cross-sectional view showing a modification of the instant invention.

Referring to the drawings, a motion transmitting remote control assembly constructed in accordance with the instant invention is generally shown at 10.

The assembly includes flexible conduit means, generally indicated at 12, which consists of a hollow, flexible casing member 14, flexible load bearing means, generally indicated at 16, comprising a plurality of helically wound wire members 18, and a flexible covering or sheath 20 surrounding the wire members 18.

Tubular end members or end fittings, such as end fitting 22, are attached at each end of the conduit means 12. The end member 22 is tubular and includes external threads 24 and a nut 26 for securing the end member 22 to a bulkhead. Since both ends of the assembly are substantially identical, only one end is shown. In the embodiment shown, the attachment between the end member 22 and the conduit means 12 is effected by providing an internal swaging sleeve 28 in the countersunk end of the end member 22. An annular space is thus defined between the swaging sleeve 28 and the interior wall of the end member 22 into which the wire members 18 extend. As shown in FIG. 1, the sheath 20 and the casing 14 abut the end member 22 and swaging sleeve 28 respectively. A mandrel (not shown) is positioned within the swaging sleeve 28 and the end member 22 is swaged so that a relatively permanent connection is formed between the end member 22, the wire members 18, and the swaging sleeve 28. A sleeve member 30 is then disposed about the connection. It is noted that other methods may be employed to connect the load bearing wire members 18 to the end member 22. It is only necessary that the connection be one which permits the transmission of operational forces from the wire members 18 to the end member 22 for reaction. In other words, the conduit means 12 is reinforced by means, such as the wire members 18, so that it can carry the operational loads. The connection between the wire members 18 must, therefore, be capable of transmitting loads to the end fitting 22.

A motion transmitting core element 32 is supported for axial movement within the conduit means 12. The ends of the core element 32 are connected to a control rod member 34 by suitable means, such as a pair of pins 36 which extend through the control rod member 34 and core element 32. The control rod member 34 extends out of the end member 22 and is adapted for attachment either to a control or a controlled member. For this purpose, the end of the control rod member 34 may be provided with external threads 38 or some other means for attachment.

To facilitate axial movement of the core element 32, the assembly is provided with a plurality of antifriction members, generally indicated at 40, comprising a plurality of ball bearings 42 which are retained in spaced relationship by retaining means 44 consisting of a standard ball retainer. As shown, the core element 32 includes suitable grooves 46 in which the ball bearings 42 ride. The purpose of the antifriction members 40, of course, is to facilitate axial movement of the core element 32 by reducing friction.

The assembly also includes race members, generally indicated at 48, which provide a rolling surface for the ball bearings 42 of the antifriction members 40. As shown in FIGS. 2 and 5, these race members 48 are unanchored and freely, axially movable with respect to the conduit means 12. Accordingly, the race members 48 are not subjected to tensile or compressive forces when the conduit means 12 is flexed or bent.

More specifically, and referring particularly to FIG. 2, the race members 48 terminate within the end members 22. The ends of the race members 48 are supported in radial, spaced relation with respect to the core element 32 by support means which comprise the shoe members 50. To provide the attachment between the race members 48 and the shoes 50, each shoe 50 is provided with a post 52 which extends into an aperture 54 in the race member 48. It is noted that the undersides of the shoe members 50 slidingly engage the core element 32. The ends of the race members 48 are consequently prevented from drooping toward the core element 32 and possibly interfering with the axial movement thereof.

To prevent the race members 48 from moving out of the end member 22, the end member 22 is provided with four circumferentially disposed indentations 56. These indentations 56 merely act as stops to keep the race members 48 within the conduit means 12.

It is pointed out that in the assembly described, the race members 48 are not called upon to transmit loads to the end members 22. For this reason, it is unnecessary that they be anchored or otherwise in force transmitting relationship with the end members 22. The load bearing or load transmitting function is accomplished by the load bearing means 16 which reinforces the conduit means, comprising the wire members 18. The helically wound wire members 18, therefore, constitute a load path between the end members 22. Furthermore, the wire members 18 are capable of flexing and bending to a much greater extent than "anchored" race members. Bending of the assembly is, therefore, relatively unrestricted by the race members 48. As a consequence, the use of unanchored race members 48 and the wire members 18 permits a greater degree of bending than motion transmitting remote control assemblies having fixed or anchored race members.

The race members 48 include a race portion 58 which is arcuate in transverse cross section to provide a race or path for the ball bearings 42. The race members 48 also include resilient means for urging the race portion 58 toward the ball bearings 42 and, consequently, the ball bearings 42 are urged toward the core element 32. This, therefore, ensures positive rolling action between the ball bearings 42 and the core element 32 which results in maximum efficiency in motion transmission.

The resilient means includes two return bends 60 which extend inwardly from the outer edges of the race portion 58. The return bends 60 are spaced from the race portion 58 and are in engagement with the conduit means 12. More specifically, the return bends 60 are generally parallel to the race portion 58. Furthermore, the return bends 60 are arcuate and conform generally to the curvature of the conduit means 12. That is, the curvature of the return bends 60 corresponds closely to the curvature of the inner surface of the flexible casing 14.

Due to the resilience of the return bends 60, the return bends push against the flexible casing 14 to urge the ball bearings 42 into positive rolling engagement with the core element 32. In other words, the race member 48 acts as a spring member for preloading the ball bearings 42. That is, the return bends 60 are flexed inwardly to some extent in the assembled position as shown in FIGS. 3 and 4.

In the event that the conduit means 12 is bent, the return bends 60 of the race members 48 will continue to urge the ball bearings 42 toward the core element 32 to facilitate positive rolling action therebetween.

The invention has been described in an illustrative manner, and it is to be understood that the terminology which has been used is intended to be in the nature of words of description rather than of limitation.

Obviously, many modifications and variations in the instant invention are possible in light of the above teachings. It is, therefore, to be understood that the invention may be practiced otherwise than as specifically described and yet remain within the scope of the depending claims.

The embodiments of the instant invention in which an exclusive property or privilege is claimed are defined as follows:

1. A motion transmitting remote control assembly comprising: flexible conduit means, tubular end members at each end of said conduit means, load bearing means surrounding a portion of said conduit means and attached to said end members, a motion transmitting core element supported for axial movement within said conduit means, antifriction means for engaging said core element for facilitating movement thereof, retainer means for retaining said antifriction means, and unanchored, freely axially movable race members disposed between said antifriction means and said conduit means whereby bending of said assembly is relatively unrestricted by said race members.

2. An assembly as set forth in claim 1 wherein said load bearing means includes a plurality of helically wound wire members.

3. An assembly as set forth in claim 1 including support means for supporting the ends of said race members.

4. An assembly as set forth in claim 3 including control rod members attached to the ends of said core element and extending out of said tubular end members.

5. An assembly as set forth in claim 4 wherein said support means includes a portion of said control rod member.

6. An assembly as set forth in claim 5 wherein said load bearing means includes a plurality of helically wound wire members.

7. An assembly as set forth in claim 6 wherein said conduit means includes a flexible casing member surrounded by said wire members.

8. An assembly as set forth in claim 7 wherein said conduit means includes a flexible sheath member surrounding said wire members.

9. An assembly as set forth in claim 8 wherein said race member includes a race portion engaging said antifriction means and resilient means for urging said race portion toward said antifriction means and said roller members toward said core element.

10. An assembly as set forth in claim 9 wherein said resilient means includes two return bends extending inwardly from the outer edges of said race portion, said return bends being spaced from said race portion and in engagement with said conduit means.

11. An assembly as set forth in claim 10 wherein said return bends are generally parallel to said race portion.

12. An assembly as set forth in claim 11 wherein said return bends are arcuate and conform generally to the curvature of said conduit means.

13. An assembly as set forth in claim 3 wherein said support means includes a shoe member fixed to said race member and slidably engaging said core element.

14. An assembly as set forth in claim 13 including control rod members attached to the ends of said core element and extending out of said tubular end members.

15. An assembly as set forth in claim 14 wherein said load bearing means includes a plurality of helically wound wire members.

16. An assembly as set forth in claim 15 wherein said conduit means includes a flexible casing member surrounded by said wire members.

17. An assembly as set forth in claim 16 wherein said conduit means includes a sheath member surrounding said wire members.

18. An assembly as set forth in claim 17 wherein said race member includes a race portion engaging said roller members and resilient means for urging said race portion toward said antifriction means and said antifriction means toward said core element.

19. An assembly as set forth in claim 18 wherein said resilient means includes two return bends extending inwardly from the outer edges of said race portion, said return bends being spaced from said race portion and in engagement with said conduit means.

20. An assembly as set forth in claim 19 wherein said return bends are generally parallel to said race portion.

21. An assembly as set forth in claim 20 wherein said return bends are arcuate and generally conform to the curvature of said conduit means.

* * * * *